(12) United States Patent
MacDonald et al.

(10) Patent No.: US 9,081,554 B2
(45) Date of Patent: Jul. 14, 2015

(54) HEAT EXCHANGER ASSEMBLY FOR ELECTRONIC DEVICE

(71) Applicant: Intel Corporation, Santa Clara, CA (US)

(72) Inventors: Mark MacDonald, Beaverton, OR (US); Yoshifumi Nishi, Ushiku (JP)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 13/730,381

(22) Filed: Dec. 28, 2012

(65) Prior Publication Data

US 2014/0185240 A1 Jul. 3, 2014

(51) Int. Cl.
*H05K 7/20* (2006.01)
*G06F 1/20* (2006.01)

(52) U.S. Cl.
CPC ..................................... *G06F 1/203* (2013.01)

(58) Field of Classification Search
CPC ...... G06F 1/20; H01L 23/427; F28D 15/0275
See application file for complete search history.

(56) References Cited

U.S. PATENT DOCUMENTS

| | | | | | |
|---|---|---|---|---|---|
| 5,540,276 | A * | 7/1996 | Adams et al. | | 165/151 |
| 5,940,269 | A * | 8/1999 | Ko et al. | | 361/697 |
| 6,166,906 | A * | 12/2000 | Sun et al. | | 361/697 |
| 6,421,239 | B1 * | 7/2002 | Huang | | 361/696 |
| 6,625,024 | B2 * | 9/2003 | Mermet-Guyennet | | 361/700 |
| 6,752,201 | B2 * | 6/2004 | Cipolla et al. | | 165/121 |
| 6,913,072 | B2 * | 7/2005 | Luo | | 165/104.21 |
| 6,945,318 | B2 * | 9/2005 | Ma et al. | | 165/104.33 |
| 7,128,135 | B2 * | 10/2006 | Mok et al. | | 165/104.26 |
| 7,312,985 | B2 * | 12/2007 | Lee et al. | | 361/679.48 |
| 7,333,336 | B2 * | 2/2008 | Kim | | 361/709 |
| 7,443,677 | B1 * | 10/2008 | Zhou et al. | | 361/702 |
| 7,447,030 | B2 * | 11/2008 | Hwang et al. | | 361/700 |
| 7,475,718 | B2 * | 1/2009 | Reyzin et al. | | 165/104.33 |
| 7,489,510 | B1 * | 2/2009 | Hung et al. | | 361/700 |
| 7,529,085 | B2 * | 5/2009 | Makley et al. | | 361/679.48 |
| 7,643,294 | B2 * | 1/2010 | Guo et al. | | 361/700 |
| 7,672,131 | B2 * | 3/2010 | Wu | | 361/700 |
| 7,835,152 | B2 * | 11/2010 | Wang et al. | | 361/710 |
| 7,916,469 | B2 * | 3/2011 | Zhou et al. | | 361/679.47 |
| 8,050,038 | B2 * | 11/2011 | Chen et al. | | 361/719 |
| 8,072,762 | B2 * | 12/2011 | Li et al. | | 361/719 |
| 8,102,649 | B2 * | 1/2012 | Ma et al. | | 361/679.47 |
| 2002/0033249 | A1 * | 3/2002 | Chuang | | 165/104.33 |
| 2003/0000684 | A1 * | 1/2003 | Huang et al. | | 165/104.33 |
| 2003/0024688 | A1 * | 2/2003 | Dowdy et al. | | 165/80.3 |
| 2003/0141041 | A1 * | 7/2003 | Chen | | 165/80.3 |
| 2003/0161102 | A1 * | 8/2003 | Lee et al. | | 361/687 |
| 2003/0183373 | A1 * | 10/2003 | Sarraf et al. | | 165/104.33 |
| 2004/0201958 | A1 * | 10/2004 | Lev | | 361/687 |
| 2006/0054307 | A1 * | 3/2006 | Lee et al. | | 165/80.3 |
| 2007/0227699 | A1 * | 10/2007 | Nishi | | 165/96 |
| 2007/0268668 | A1 * | 11/2007 | Lin et al. | | 361/697 |
| 2008/0202729 | A1 * | 8/2008 | Mochizuki | | 165/104.14 |
| 2009/0000774 | A1 * | 1/2009 | MacDonald et al. | | 165/122 |
| 2009/0229791 | A1 * | 9/2009 | Hung et al. | | 165/80.3 |
| 2010/0258277 | A1 * | 10/2010 | Chen et al. | | 165/104.26 |

* cited by examiner

*Primary Examiner* — Adrian S Wilson
(74) *Attorney, Agent, or Firm* — Alpine Technology Law Group LLC

(57) ABSTRACT

In one embodiment a heat exchanger assembly comprises at least one heat pipe and a casing which is to receive a blower, the casing comprising a plurality of heat exchanging plates, wherein at least one of the heat exchanging plates comprises at least one tongue which is to cover a portion of an exterior surface of the at least one heat pipe. Other embodiments may be described.

18 Claims, 8 Drawing Sheets

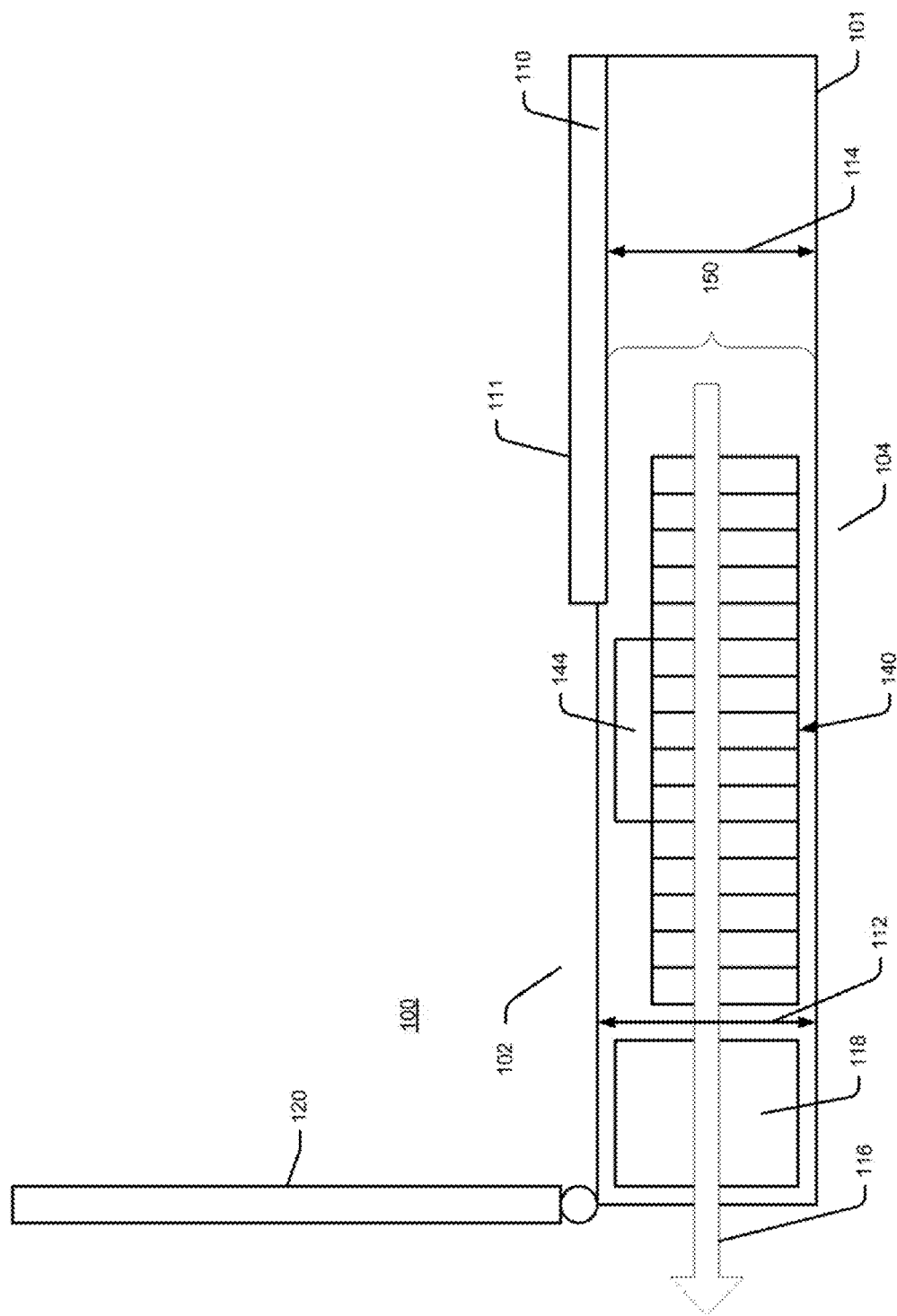

HEAT EXCHANGER ASSEMBLY FOR ELECTRONIC DEVICE

RELATED APPLICATIONS

None.

BACKGROUND

The subject matter described herein relates generally to the field of electronic devices and more particularly to a heat exchanger assembly for one or more electronic devices.

Modern computing systems generate heat during operation. The heat may affect certain platform components of a system, and is therefore generally required to be dissipated or removed from the system. Heat generated by the computing system may be limited or reduced using various thermal management techniques and/or heat dissipation techniques. For example, heat generated by a processor may be dissipated by creating a flow of air using a fan or blower. Further, various platform-level cooling devices may be implemented in conjunction with the fan or blower to enhance heat dissipation, such as heat pipes, heat spreaders, heat sinks, vents, phase change materials or liquid-based coolants. Accordingly, systems and methods to remove heat from electronic devices may find utility.

BRIEF DESCRIPTION OF THE DRAWINGS

The detailed description is described with reference to the accompanying figures.

FIG. 1 is a schematic illustration of an electronic device which may be modified to include a heat exchanger assembly in accordance with some embodiments.

DETAILED DESCRIPTION

Figure 2A:
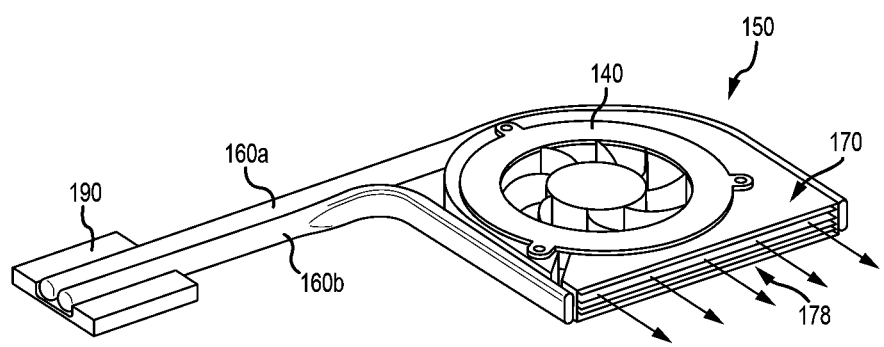
FIGS. 2A-2E are schematic perspective views of a heat exchanger assembly in accordance with some embodiments.

Described herein are exemplary embodiments of a heat exchanger assembly for an electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Any reference herein to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 is a schematic illustration of an electronic device 100 which may be modified to include a heat exchanger assembly in accordance with some embodiments. Electronic device 100 may comprise a notebook computer, laptop computer, electronic reader, game console, or the like. As shown in FIG. 1, electronic device 100 comprises a housing 101, keyboard 111, and display 120. The embodiments of electronic device 100, however, are not limited to the elements shown in this figure.

In various embodiments, housing 101 may include a first section 102 and a second section 104 which define an internal chamber. In some embodiments, a portion of the first section 102 may be recessed in a direction of the second section 104. The recessed portion 110 of the housing 101 may be configured to accommodate a keyboard assembly such as keyboard 111. The housing may have a first internal height 112 between the first section 102 and the second section 104 and a second internal height 114 between the recessed portion 110 of the first section 102 and the second side section.

In various embodiments, electronic device 100 may comprise at least one heat generating component, such as an integrated circuit, and a heat exchanger assembly 150 disposed within the internal chamber of the housing. The heat exchanger assembly may comprise a fan or blower 140 driven by a motor 144 and arranged to a flow of air through the blower 140 in a direction perpendicular to the axis of rotation of the blower.

Motor 144 may comprise any suitable electric motor capable of rotating blower 140 to create a flow of air in some embodiments. In various embodiments, motor 144 may comprise an AC motor, brushed DC motor or brushless DC motor. For example, motor 144 may comprise a DC motor powered by an internal or external power source of apparatus 100. In some embodiments, motor 144 may comprise a tip-drive motor or an ultrathin motor. The size, location within housing 101, and location with respect to blower 140 may be selected based on the size and performance constraints of a particular implementation.

Motor 144 may be positioned above or below the blower 140, for example. In various embodiments, the motor 144 may be positioned between the blower 140 and the first side 102 of the housing 101. In some embodiments, the motor 144 may have a height that is approximately equal to a difference between the first internal height 112 and the second internal height 114 or a difference between the first internal height 112 and the axial height of the blower 140. In this manner, the total internal height (e.g. height 112) may be fully utilized by the combination of blower 140 and motor 144.

In some embodiments, motor 144 may be positioned centrally above the axis of blower 140 and may control or spin the blower 140 to generate a flow of air 116. Furthermore, the motor 144 may be located between keyboard 111 and display 120, which may be coupled to housing 101 such that the display 120 may be rotated with respect to the housing 101, in some embodiments. In various embodiments, a cooling device 118 such as a heat sink, heat spreader, or other heat dissipation component may assist with heat dissipation for the electronic device 100.

FIGS. 2A-2E are schematic, perspective views of a heat exchanger assembly 150 in accordance with some embodiments. Referring first to FIG. 2A in some embodiments a heat exchanger assembly 150 comprises at least one heat pipe 160, and a casing 170 to receive a blower 140, as described with reference to FIG. 1. Heat exchanger assembly 150 may further comprise a cooling device 190 coupled to the heap pipe 160.

In some embodiments the casing 170 may comprise a plurality of heat exchanging plates 172, which may be arranged in a stack to define a central aperture 176 which is to receive a blower 140. Heat exchanging plates 172 may be formed from a suitably rigid thermally conductive material, e.g., a metal or a composite material. In the embodiment depicted in FIG. 2A the casing 170 comprises six heat exchanging plates 172. However the specific number of heat exchanging plates 172 is not critical and may vary. The heat exchanging plates 172 may be secured by one or more conventional fasteners.

In some embodiments the cooling device 190 may be embodied as an active cooling device such as a heat pump, while in other embodiments the cooling device 190 may be embodied as a passive device such as a heat sink or a heat spreader.

The embodiment depicted in FIG. 2A includes two heat pipes 160*a*, 160*b*, which may be referred to collectively by reference numeral 160. In some embodiments at least a portion of heat pipes 160*a*, 160*b* are substantially parallel and separated by an air gap. In some embodiments heat pipes 160 may be formed from a thermally conductive material, e.g., copper or the like, and may comprise a heat exchanging fluid, e.g., a coolant, that circulates in the heat pipes 160 between the cooling device 190 and the casing 170. In alternate embodiments the heat pipe 160 may not circulate a heat exchanging fluid. Rather, the heat pipe may rely on the thermal conductivity of the heat pipe 160 to conduct heat from the casing 170 to the cooling device 190.

As illustrated in FIG. 2A, in some embodiments a portion of heat pipe 160*a* is positioned to be in thermal communication with a first portion of the casing 170 while a portion of heap pipe 160*b* is positioned to be in thermal communication with a second portion of the casing 170. In alternate embodiments only a single heat pipe 160 may be used. In some embodiments the at least one heat pipe 160 establishes a side wall of portions of the casing 170 that forms an airflow barrier around portions of the casing 170 to define at least one airflow outlet 178.

Figure 2B:
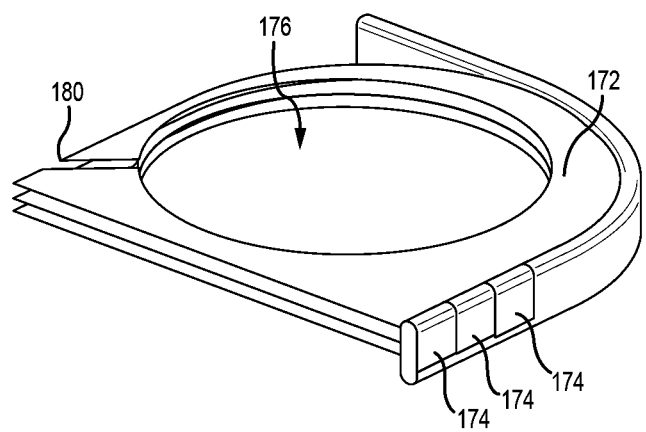
Figure 2C:
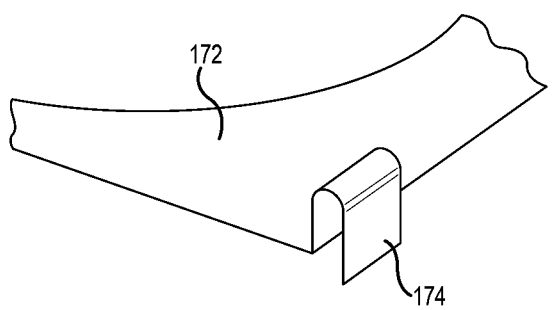
Figure 2D:
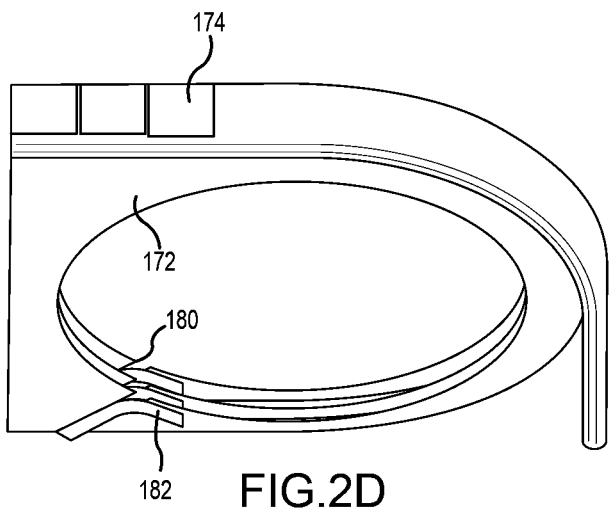

Referring now to FIGS. 2B-2D, in some embodiments one or more of the heat exchanging plates 172 at least one tongue 174 which is configured to cover a portion of the a heat pipe 160 to facilitate heat exchange between the heat exchanging plate 172 and the heat pipe 160. In some embodiments each of the plurality of heat exchanging plates 172 comprises at least one tongue 174 and the respective tongues 174 are laterally offset such that the respective tongues 174 cover adjacent portions of the at least one heat pipe 160, as best illustrated in FIGS. 2B and 2D.

Figure 2E:
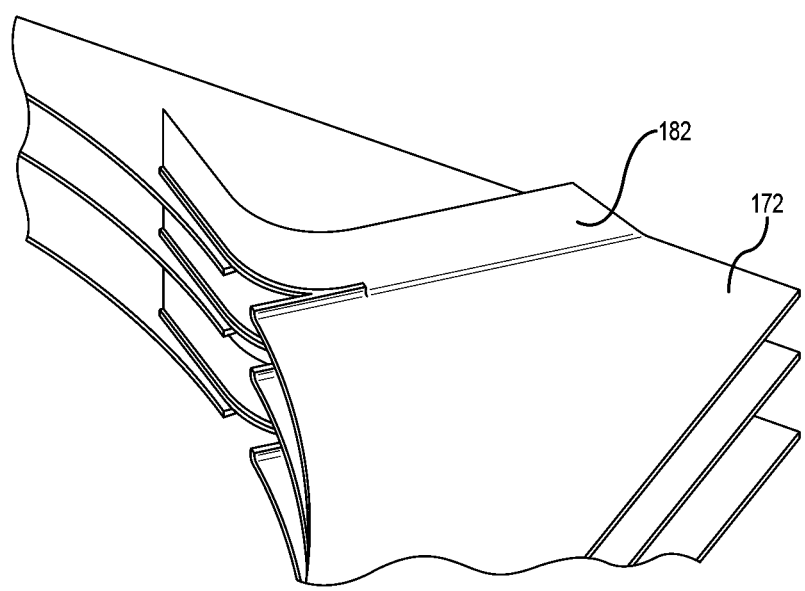

As best illustrated in FIGS. 2B and 2D-2E, in some embodiments at least one heat exchanging plate comprises a channel 180 extending from the central aperture 178 to an edge of the heat exchanging plate 172. A lip 182 extends from at least one edge of the channel 180 to facilitate airflow through channel 180. In some embodiments the lip 182 may also provide a measure of structural integrity to the casing 170.

Figure 3:
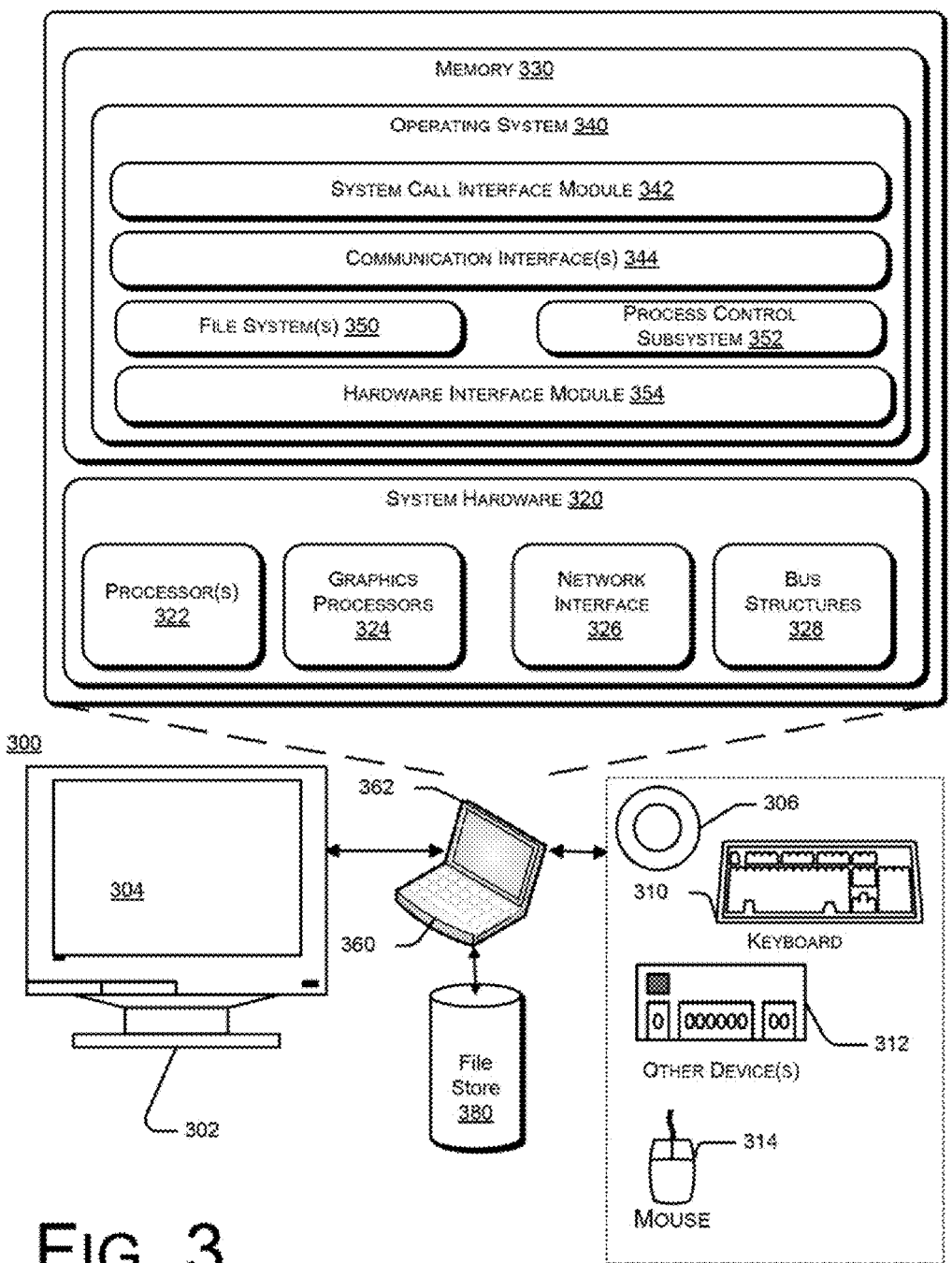
FIGS. 3-6 are schematic illustrations of an electronic device which may be adapted to include a heat exchanger assembly, according to an embodiment.

In some embodiments a heat exchanger assembly 150 such as that depicted in FIGS. 2A-2E may be used in an electronic device such as in an laptop computer to provide enhanced cooling capability compared to traditional cooling methods that rely on centrifugal blowers that require inlet gaps above and/or below the blower in order to draw air through the notebook. FIG. 3 is a schematic illustration of an exemplary electronic device 300 in accordance with some embodiments. In one embodiment, electronic device 300 may include one or more accompanying input/output devices such as one or more speakers 306, a keyboard 310, one or more other I/O device(s) 312, and a mouse 314. The other I/O device(s) 312 may include a touch screen, a voice-activated input device, a track ball, and any other device that allows the electronic device 300 to receive input from a user.

In various embodiments, the electronic device 300 may be embodied as a personal computer, a laptop computer, a personal digital assistant, a mobile telephone, an entertainment device, or another computing device. The electronic device 300 includes system hardware 320 and memory 330, which may be implemented as random access memory and/or read-only memory. A file store 380 may be communicatively coupled to electronic device 300. File store 380 may be internal to computing device 308 such as, e.g., one or more hard drives, CD-ROM drives, DVD-ROM drives, or other types of storage devices. File store 380 may also be external to computer 144 such as, e.g., one or more external hard drives, network attached storage, or a separate storage network.

System hardware 320 may include one or more processors 322, graphics processors 324, network interfaces 326, and bus structures 328. In one embodiment, processor 322 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some embodiments one of the processors 322 in system hardware 320 may comprise a low-power embedded processor, referred to herein as a manageability engine (ME). The manageability engine 322 may be implemented as an independent integrated circuit or may be a dedicated portion of a larger processor 322.

Graphics processor(s) 324 may function as adjunct processor that manages graphics and/or video operations. Graphics processor(s) 324 may be integrated onto the motherboard of computing system 300 or may be coupled via an expansion slot on the motherboard.

In one embodiment, network interface 326 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II; Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 328 connect various components of system hardware 328. In one embodiment, bus structures 328 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 330 may include an operating system 340 for managing operations of computing device 308. In one embodiment, operating system 340 includes a hardware interface module 354 that provides an interface to system hardware 320. In addition, operating system 340 may include a file system 350 that manages files used in the operation of electronic device 300 and a process control subsystem 352 that manages processes executing on electronic device 300.

Operating system 340 may include (or manage) one or more communication interfaces that may operate in conjunction with system hardware 320 to transceive data packets and/or data streams from a remote source. Operating system 340 may further include a system call interface module 342 that provides an interface between the operating system 340 and one or more application modules resident in memory 330. Operating system 340 may be embodied as a UNIX operating system or any derivative thereof (e.g., Linux, Solaris, etc.) or as a Windows® brand operating system, or other operating systems.

In one embodiment, electronic device 300, comprises a clamshell body which includes a first section 360, commonly referred to as a base, which houses a keyboard, a motherboard, and other components, and a second section 362 which houses a display. The first section 360 and the second section 362 are connected by a hinge assembly which enables the clamshell body to open and close.

Figure 4:
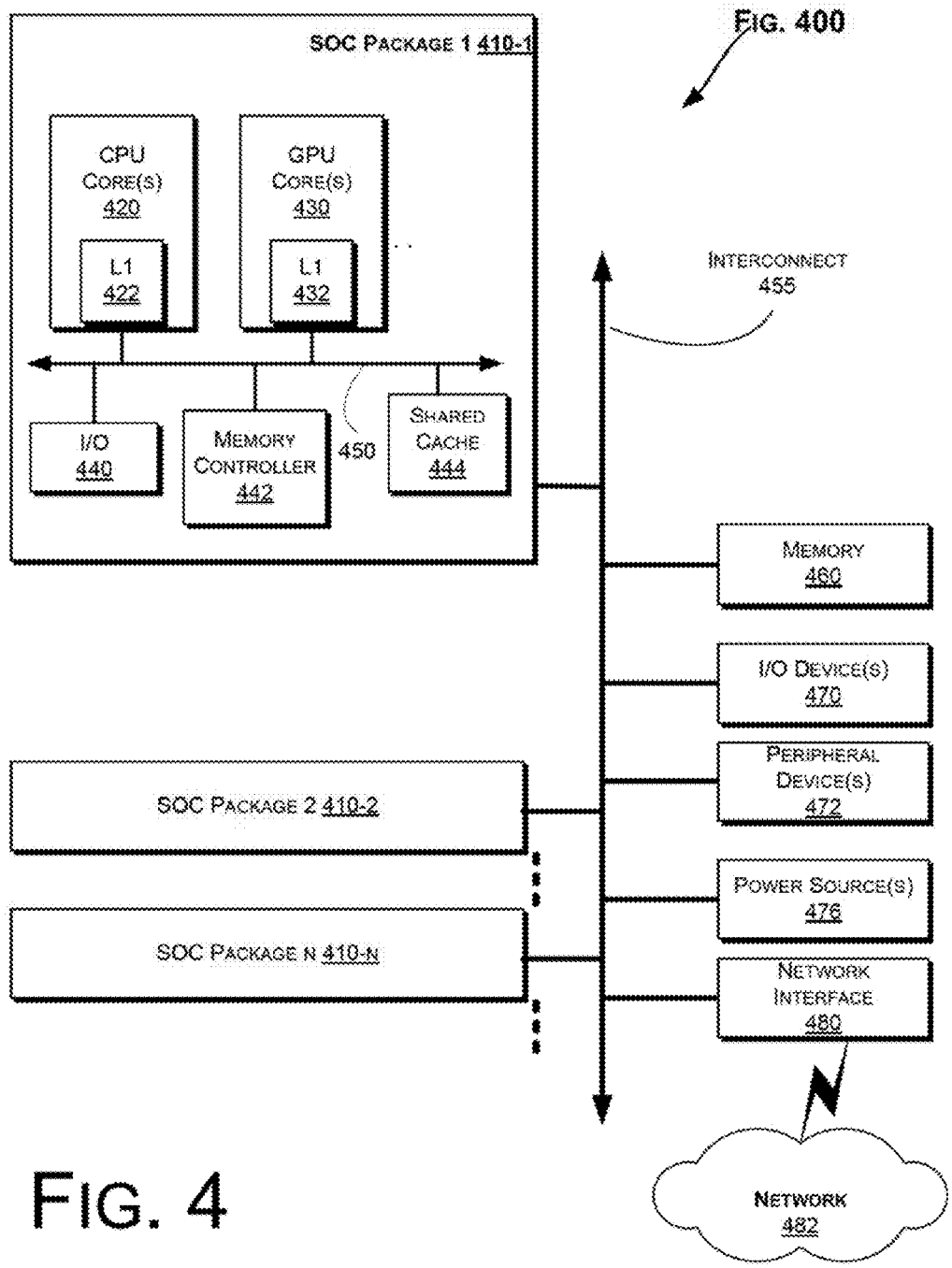

As described above, in some embodiments the electronic device may be embodied as a system on a chip (SOC) computer-based system. FIG. 4 illustrates a block diagram of a system 400 in accordance with an embodiment. The computing system 400 may include one or more SOC packages 410 which, in turn, may include one or more central processing unit (CPU) cores 420 which may include integrated level 1 cache 422, one or more graphics processor unit (GPU) cores 430, which may include integrated level 1 cache 432, an input/output interface 440, a memory controller 442 and shared cache 444. The various components may be coupled to an interconnect 450.

As illustrated in FIG. 4, the device 400 may comprise a plurality of SOC packages 410-1, 410-2, 410-n. The respective SOC packages 410 may be coupled to one or more external devices via a suitable interconnect 455.

In some embodiments the device 400 may comprise memory 460, which may store data, including sequences of instructions, that may be executed by the CPU core(s) 420, GPU core(s) 430, or any other device included in the system 400. In some embodiments, memory 460 may include one or more volatile storage (or memory) devices such as random access memory (RAM), dynamic RAM (DRAM), synchronous DRAM (SDRAM), static RAM (SRAM), or other types of storage devices. Memory 460 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions).

System 400 may comprise one or more input/output (I/O) devices 470 coupled to SOC packages 410 via interconnect 455. I/O device(s) may include one or more of a keyboard, a mouse, a touchpad, a display, a touchscreen, a speaker, or the like.

System 400 may comprise one or more peripheral devices 472 coupled to SOC packages 410 via interconnect 455. Peripheral devices 472 may comprise Integrated drive electronics (IDE) or small computer system interface (SCSI) hard drive(s), USB port(s), parallel port(s), serial port(s), floppy disk drive(s), digital output support (e.g., digital video interface (DVI)), or other devices.

System 400 may comprise one or more power sources 476 coupled to SOC packages 410 via interconnect 455. Power source(s) 476 may comprise one or more power sources, e.g., a battery, and/or an AC/DC adapter to convert AC power from an external power source to DC power.

System 400 may comprise a network interface 480 to provide a communication interface to a network 482. Network interface 480 may be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface is a general packet radio service (GPRS) interface (see, e.g. Guidelines on GPRS Handset Requirements, Global System for Mobile Communications/GSM Association, Ver. 3.0.1, December 2002).

Figure 5:
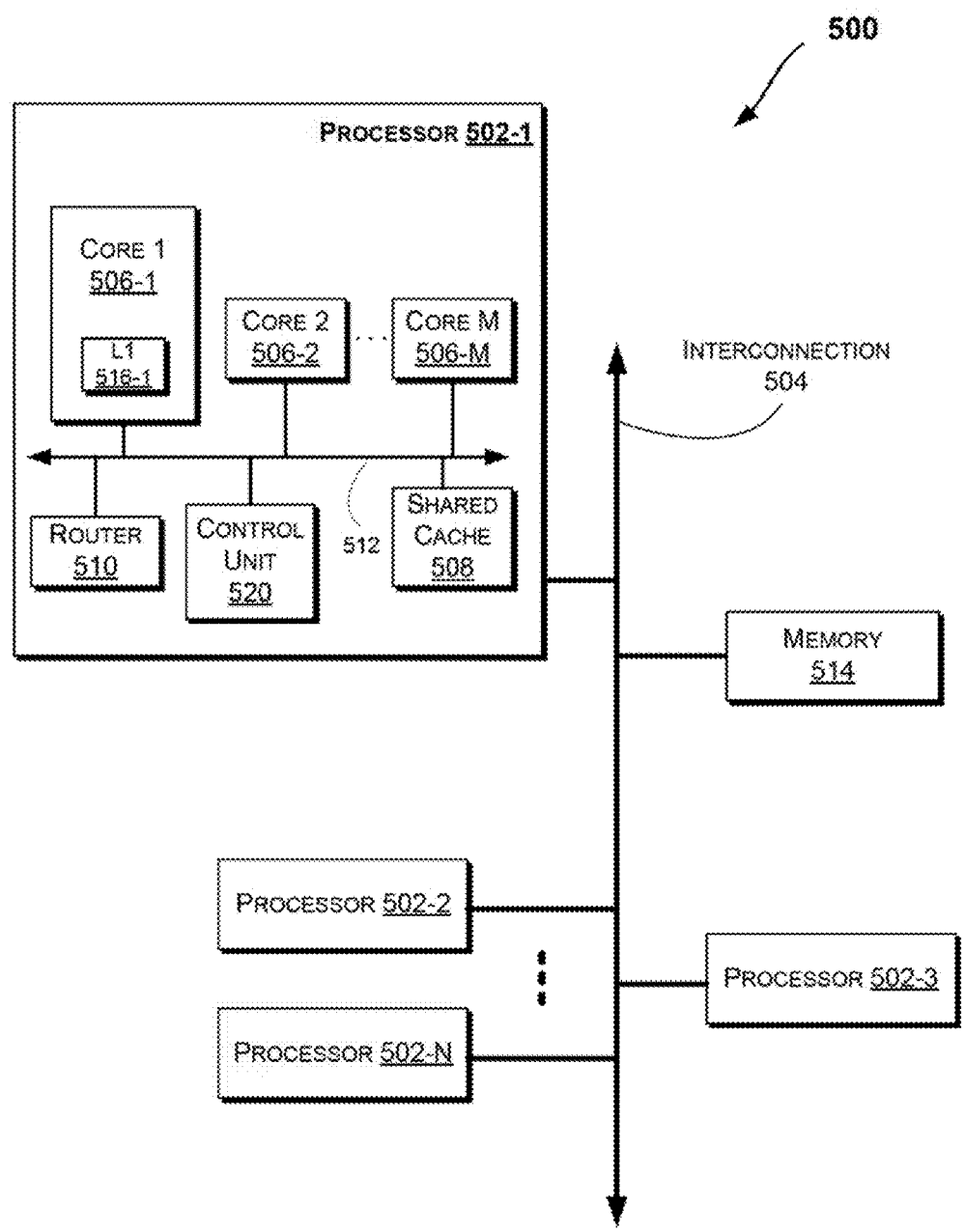

FIG. 5 illustrates a block diagram of a computing system 500, according to an embodiment of the invention. The system 500 may include one or more processors 502-1 through 502-N (generally referred to herein as "processors 502" or "processor 502"). The processors 502 may communicate via an interconnection network or bus 504. Each processor may include various components some of which are only discussed with reference to processor 502-1 for clarity. Accordingly, each of the remaining processors 502-2 through 502-N may include the same or similar components discussed with reference to the processor 502-1.

In an embodiment, the processor 502-1 may include one or more processor cores 506-1 through 506-M (referred to herein as "cores 506" or more generally as "core 506"), a shared cache 508, a router 510, and/or a processor control logic or unit 520. The processor cores 506 may be implemented on a single integrated circuit (IC) chip. Moreover, the chip may include one or more shared and/or private caches (such as cache 508), buses or interconnections (such as a bus or interconnection network 512), memory controllers (such as those discussed with reference to FIGS. 4-5), or other components.

In one embodiment, the router 510 may be used to communicate between various components of the processor 502-1 and/or system 500. Moreover, the processor 502-1 may include more than one router 510. Furthermore, the multitude of routers 510 may be in communication to enable data routing between various components inside or outside of the processor 502-1.

The shared cache 508 may store data (e.g., including instructions) that are utilized by one or more components of the processor 502-1, such as the cores 506. For example, the shared cache 508 may locally cache data stored in a memory 514 for faster access by components of the processor 502. In an embodiment, the cache 508 may include a mid-level cache (such as a level 2 (L2), a level 3 (L3), a level 4 (L4), or other levels of cache), a last level cache (LLC), and/or combinations thereof. Moreover, various components of the processor 502-1 may communicate with the shared cache 508 directly, through a bus (e.g., the bus 512), and/or a memory controller or hub. As shown in FIG. 5, in some embodiments, one or more of the cores 506 may include a level 1 (L1) cache 516-1 (generally referred to herein as "L1 cache 516"). In one embodiment, the controller 520 may include logic to implement the operations described above with reference to FIG. 3.

Figure 6:
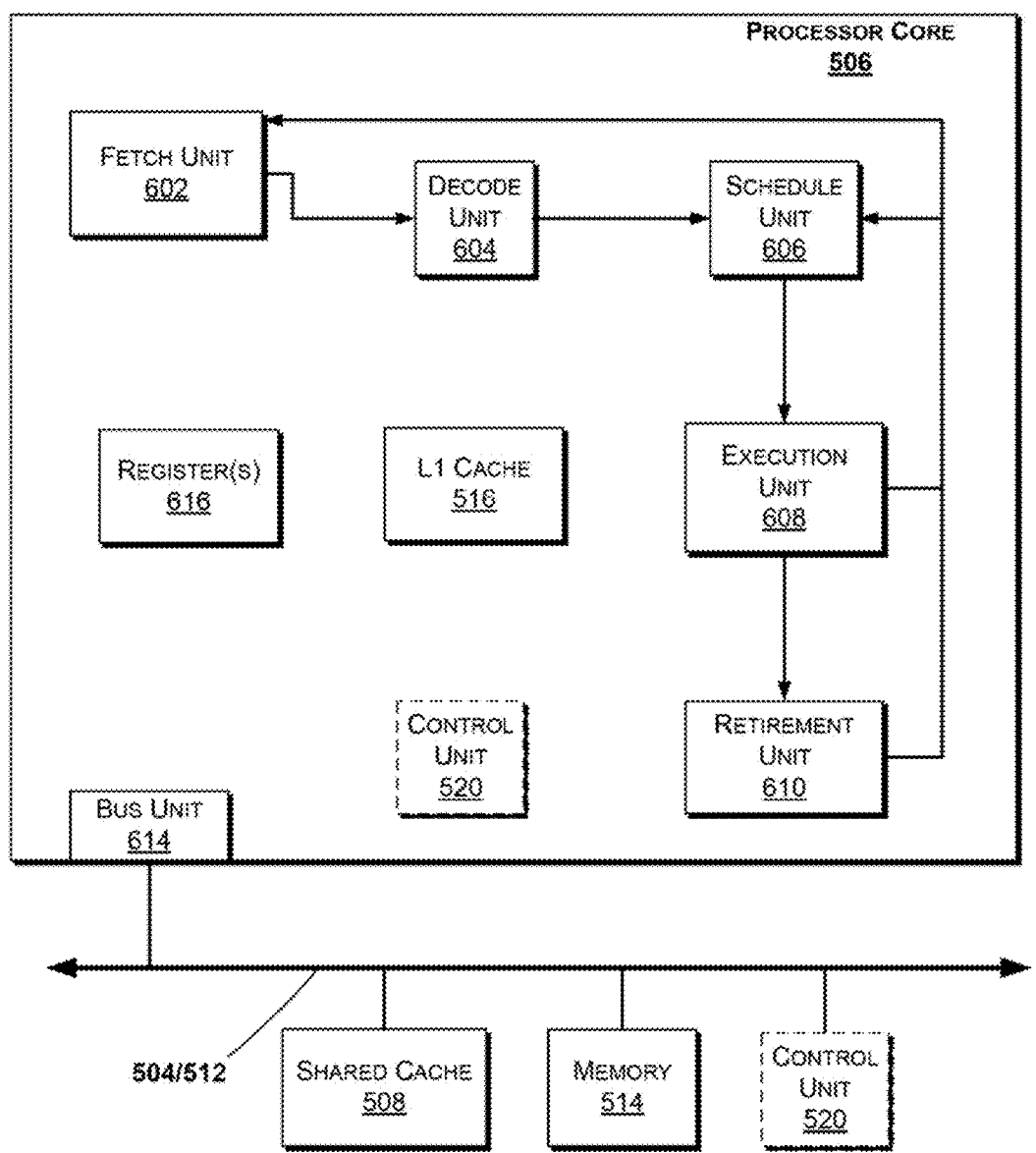

FIG. 6 illustrates a block diagram of portions of a processor core 506 and other components of a computing system, according to an embodiment of the invention. In one embodiment, the arrows shown in FIG. 6 illustrate the flow direction of instructions through the core 106. One or more processor cores (such as the processor core 106) may be implemented on a single integrated circuit chip (or die) such as discussed with reference to FIG. 5. Moreover, the chip may include one or more shared and/or private caches (e.g., cache 508 of FIG. 5), interconnections (e.g., interconnections 504 and/or 112 of FIG. 5), control units, memory controllers, or other components.

As illustrated in FIG. 6, the processor core 506 may include a fetch unit 602 to fetch instructions (including instructions with conditional branches) for execution by the core 606. The instructions may be fetched from any storage devices such as the memory 514. The core 506 may also include a decode unit 604 to decode the fetched instruction. For instance, the decode unit 604 may decode the fetched instruction into a plurality of uops (micro-operations).

Additionally, the core 606 may include a schedule unit 606. The schedule unit 606 may perform various operations associated with storing decoded instructions (e.g., received from the decode unit 604) until the instructions are ready for dispatch, e.g., until all source values of a decoded instruction become available. In one embodiment, the schedule unit 606 may schedule and/or issue (or dispatch) decoded instructions to an execution unit 608 for execution. The execution unit 608 may execute the dispatched instructions after they are decoded (e.g., by the decode unit 604) and dispatched (e.g., by the schedule unit 606). In an embodiment, the execution unit 608 may include more than one execution unit. The execution unit 608 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 608.

Further, the execution unit 608 may execute instructions out-of-order. Hence, the processor core 506 may be an out-of-order processor core in one embodiment. The core 506 may also include a retirement unit 610. The retirement unit 610 may retire executed instructions after they are committed. In an embodiment, retirement of the executed instructions may result in processor state being committed from the execution of the instructions, physical registers used by the instructions being de-allocated, etc.

The core 106 may also include a bus unit 614 to enable communication between components of the processor core 506 and other components (such as the components discussed with reference to FIG. 6) via one or more buses (e.g., buses 604 and/or 612). The core 106 may also include one or more registers 616 to store data accessed by various components of the core 506 (such as values related to power consumption state settings).

Furthermore, even though FIG. 5 illustrates the control unit 520 to be coupled to the core 506 via interconnect 512, in various embodiments the control unit 520 may be located elsewhere such as inside the core 506, coupled to the core via bus 504, etc.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A heat exchanger assembly, comprising:
   at least one heat pipe;
   a casing which is to receive a blower, the casing comprising a plurality of heat exchanging plates, wherein at least one of the heat exchanging plates comprises at least one tongue which is to cover a portion of an exterior surface of the at least one heat pipe, wherein:

the plurality of heat exchanging plates each comprise at least one tongue; and
the tongues are offset in at least one dimension such that the respective tongues are to cover adjacent portions of the exterior surface of at least one heat pipe.

2. The heat exchanger assembly of claim 1, wherein the plurality of heat exchanging plates define a central aperture which is to receive a blower.

3. The heat exchanger assembly of claim 1, wherein:
the at least one heat pipe establishes an airflow barrier around portions of the casing to define at least one airflow outlet.

4. The heat exchanger assembly of claim 1, wherein the assembly comprises a first heat pipe and a second heat pipe, at least a portion of which are parallel and separated by an air gap.

5. The heat exchanger assembly of claim 4, wherein at least one heat exchanging plate comprises a channel extending from the central aperture to an edge of the heat exchanging plate and a lip extends from at least one edge of the channel.

6. The heat exchanger assembly of claim 1, further comprising a cooling device coupled to the heap pipe.

7. A housing for an electronic device, comprising:
a first section and a second section coupled to the first section to define an internal chamber;
a heat exchanger assembly disposed within the internal chamber and comprising:
at least one heat pipe;
a casing which is to receive a blower, the casing comprising a plurality of heat exchanging plates, wherein at least one of the heat exchanging plates comprises at least one tongue which is to cover a portion of an exterior surface of the at least one heat pipe, wherein:
the plurality of heat exchanging plates each comprise at least one tongue; and
the tongues are offset in at least one dimension such that the respective tongues are to cover adjacent portions of the exterior surface of at least one heat pipe.

8. The housing of claim 7, wherein the plurality of heat exchanging plates define a central aperture which is to receive a blower.

9. The housing of claim 7, wherein:
the at least one heat pipe establishes an airflow barrier around portions of the casing to define at least one airflow outlet.

10. The housing of claim 7, wherein the assembly comprises a first heat pipe and a second heat pipe, at least a portion of which are parallel and separated by an air gap.

11. The housing of claim 10, wherein at least one heat exchanging plate comprises a channel extending from the central aperture to an edge of the heat exchanging plate and a lip extends from at least one edge of the channel.

12. The housing of claim 7, further comprising a cooling device coupled to the heap pipe.

13. An electronic device, comprising:
at least one heat generating component;
a housing comprising a first section and a second section coupled to the first section to define an internal chamber;
a heat exchanger assembly disposed within the internal chamber and comprising:
at least one heat pipe;
a casing which is to receive a blower, the casing comprising a plurality of heat exchanging plates, wherein at least one of the heat exchanging plates comprises at least one tongue which is to cover a portion of an exterior surface of the at least one heat pipe, wherein:
the plurality of heat exchanging plates each comprise at least one tongue; and
the tongues are offset in at least one dimension such that the respective tongues are to cover adjacent portions of the exterior surface of at least one heat pipe.

14. The electronic device of claim 13, wherein the plurality of heat exchanging plates define a central aperture which is to receive a blower.

15. The electronic device of claim 13, wherein:
the at least one heat pipe establishes an airflow barrier around portions of the casing to define at least one airflow outlet.

16. The electronic device of claim 13, wherein the assembly comprises a first heat pipe and a second heat pipe, at least a portion of which are parallel and separated by an air gap.

17. The electronic device of claim 16, wherein at least one heat exchanging plate comprises a channel extending from the central aperture to an edge of the heat exchanging plate and a lip extends from at least one edge of the channel.

18. The electronic device of claim 13, further comprising a cooling device coupled to the heap pipe.

* * * * *